United States Patent
Kawamura et al.

(10) Patent No.: US 11,827,171 B2
(45) Date of Patent: Nov. 28, 2023

(54) SEAT FOR VEHICLE AND FOLDING METHOD OF SIDE AIRBAG

(71) Applicant: TOYOTA JIDOSHA KABUSHIKI KAISHA, Toyota (JP)

(72) Inventors: Kazuhiro Kawamura, Toyota (JP); Yuto Ota, Toyota (JP); Yuta Arai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/963,572

(22) Filed: Oct. 11, 2022

(65) Prior Publication Data

US 2023/0136525 A1  May 4, 2023

(30) Foreign Application Priority Data

Nov. 2, 2021 (JP) ................................. 2021-179710

(51) Int. Cl.
*B60R 21/207* (2006.01)
*B60R 21/231* (2011.01)
*B60R 21/237* (2006.01)

(52) U.S. Cl.
CPC .......... *B60R 21/207* (2013.01); *B60R 21/237* (2013.01); *B60R 21/23138* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 6,231,070 B1* | 5/2001 | Sunabashiri | B60R 21/237 280/730.2 |
| 7,549,672 B2* | 6/2009 | Sato | B60R 21/2338 280/730.2 |
| 8,448,981 B2* | 5/2013 | Fukawatase | B60R 21/23138 280/730.2 |
| 8,469,395 B2 | 6/2013 | Richez et al. | |
| 9,238,425 B2* | 1/2016 | Fukawatase | B60R 21/013 |
| 10,632,954 B2 | 4/2020 | Zhang et al. | |
| 11,110,884 B2* | 9/2021 | Ota | B60R 21/237 |
| 2012/0091695 A1 | 4/2012 | Richez et al. | |
| 2022/0227326 A1* | 7/2022 | Kobayashi | B60N 2/58 |
| 2023/0034054 A1* | 2/2023 | Shimizu | B60R 21/237 |

FOREIGN PATENT DOCUMENTS

| | | | | |
|---|---|---|---|---|
| CN | 104228751 A | * | 12/2014 | ....... B60R 21/23138 |
| DE | 102020124808 A1 | * | 4/2021 | ....... B60R 21/23138 |
| WO | 2011-006560 A1 | | 1/2011 | |
| WO | WO-2021149576 A1 | * | 7/2021 | ........... B60R 21/207 |

\* cited by examiner

*Primary Examiner* — Faye M Fleming
(74) *Attorney, Agent, or Firm* — Dinsmore & Shohl LLP (57) ABSTRACT

The seat for a vehicle includes a side airbag having a head chamber. The head chamber is housed along the upper frame of the seat back. The head chamber is inflated and deployed between the shoulder belt and the head upon side impact, receiving a delivery of gases from the inflator. Here, the head chamber is configured to be housed in an inner roll folded state in which the front end of the roll folding from the front end portion in the sheet longitudinal direction is wound in a roll shape so as to be wound around the sheet outside, and the front end of the roll folding from the intermediate portion is wound in a roll shape so as to be wound around the sheet inside.

6 Claims, 7 Drawing Sheets

SEAT FOR VEHICLE AND FOLDING METHOD OF SIDE AIRBAG

CROSS-REFERENCE TO RELATED APPLICATION

This application claims priority to Japanese Patent Application No. 2021-179710 filed on Nov. 2, 2021, incorporated herein by reference in its entirety.

BACKGROUND

1. Technical Field

The present disclosure relates to a seat for a vehicle and a folding method of a side airbag.

2. Description of Related Art

WO 2011-006560 discloses a side airbag in which a chest section that expands and deploys from a side region of a backrest of a seat for a vehicle and a head section that expands and deploys from an upper region of the backrest are constituted by separate bag bodies and in which the chest section and the head section are connected to each other via a tubular filler section. In this side airbag, the head section is expanded and deployed between the shoulder belt and the occupant's head, so that the head can be restrained at an early stage in the event of a side impact.

SUMMARY

In order to expand and deploy a head chamber (head section) between the shoulder belt and the head as in the technique described in the above-mentioned WO 2011-006560, it is desirable that the head chamber is inner roll folded and stored, and expanded and deployed toward the inside of the seat. However, on the sides of the head, the head chamber deploys towards the side surface of the head, which can cause abrasion on the skin. The related art described above does not consider this point and there is room for improvement.

The present disclosure provides a seat for a vehicle and a folding method of a side airbag.

A seat for a vehicle according to a first aspect of the present disclosure includes a side airbag stored along an upper frame of a seat back and including a head chamber that expands and deploys between a shoulder belt and a head by receiving supply of gas from an inflator in an event of a side impact.

Here, the head chamber is configured to be stored in an outer roll folded state in which a tip of a roll folding is wound in a roll shape so as to be wound toward an outside of the seat from a front end portion in a seat front-rear direction, and to be stored in an inner roll folded state in which the tip of the roll folding is wound in a roll shape so as to be wound toward an inside of the seat from an intermediate portion.

According to such a configuration, the side airbag is expanded and deployed by receiving supply of gas from the inflator in the event of a side impact. The side airbag has a head chamber stored along the upper frame of the seat back. This head chamber expands and deploys between the shoulder belt to restrain the occupant's head at an early stage.

Here, the head chamber is stored in a state in which the head chamber is outer roll folded from a front end portion in a seat front-rear direction and inner roll folded from an intermediate portion. Therefore, during the initial stage of expansion and deployment of the head chamber, the inner roll folding of the head chamber is released toward the inside of the seat between the shoulder belt and the head rest. As a result, the forward expansion and deployment of the head chamber in the seat front-rear direction is not impaired by the shoulder belt, and the deployment performance of the head chamber can be improved. Thereafter, during the intermediate stage of deployment of the head chamber, the outer roll folding of the head chamber is released toward the outside of the seat at the side of the head, thereby avoiding the side surface of the head from being injured by the head chamber and improving head protection performance.

In this case, "the head chamber stored along the upper frame" is a broad concept including not only the case where the whole of the head chamber is stored along the upper frame but also the case where a part of the head chamber is stored along the upper frame. Further, "in the event of a side impact" includes the case where it is predicted that a side impact occurs in the vehicle, in addition to the case where it is detected that a side impact has actually occurred in the vehicle.

In the seat according to the first aspect, the head chamber may be configured such that the intermediate portion of the head chamber is in a vicinity of a position intersecting the shoulder belt upon expansion and deployment of the head chamber.

According to such a configuration, the intermediate portion of the head chamber is in the vicinity of a position intersecting the shoulder belt during expansion and deployment. Thus, during forward expansion and deployment of the head chamber in the seat front-rear direction, the inner roll folding of the head chamber is released to a position where the head chamber passes over the shoulder belt, and release of the outer roll folding of the head chamber is started after the head chamber passes over the shoulder belt. As a result, the head chamber expands and deploys toward the inside of the seat in areas where head chamber may interfere with the shoulder belt. Therefore, since the head chamber can secure a deployment space, it is possible to more reliably pass over the shoulder belt.

In the seat according to the first aspect, the head chamber may be configured to be stored in a state in which an upper end portion in a seat up-down direction is folded downward toward an occupant side, and a folded lower end portion is folded upward toward the occupant side, and then the head chamber is rolled and folded from the front end portion in the seat front-rear direction.

According to such a configuration, an upper end portion of the head chamber in a seat up-down direction is folded downward toward an occupant side, and a folded lower end portion is folded upward toward the occupant side, and then the head chamber is rolled and folded from the front end portion in the seat front-rear direction. Thus, by folding the upper end portion of the head chamber twice in a bellows shape toward the occupant side, during expansion and deployment of the head chamber, the roll folding of the head chamber is released while at the same time, the bellows folding of the head chamber is released upward in the seat up-down direction and toward the inside of the seat. As a result, the deployment space of the head chamber can be well ensured between the shoulder belt and the head rest when the head chamber is deployed upward in the seat up-down direction and passes over the shoulder belt. Therefore, forward deployment of the head chamber in the seat front-rear direction is facilitated.

In the seat according to the first aspect, the side airbag may be configured to be stored along a shoulder from a side of a side frame of the seat back, and to further include a body chamber that expands and deploys toward a side of a body portion in the event of the side impact. Here, the head chamber and the body chamber may be composed of a single bag and are configured to be stored in a state of being rolled and folded from the front end portion in the seat front-rear direction.

According to such a configuration, the side airbag has a body chamber that expands and deploys toward the side of the body portion of the occupant to restrain the body portion in the event of a side impact of the vehicle. This body chamber is composed of a single bag together with the head chamber, so that the body chamber is stored along the shoulder from the side of the side frame of the seat back. Thus, the side airbag can be stored along the upper frame from the side of the side frame through the shoulder by configuring the head chamber and the body chamber with a single bag, which facilitates attachment. Further, since the entire side airbag including the head chamber and the body chamber can be folded by roll folding from the front end portion in the sear front-end direction, it is possible to reduce the processes required when folding into the form for storage, which facilitates manufacture.

A folding method of a side airbag according to a second aspect of the present disclosure relates to a folding method of a side airbag including a head chamber that expands and deploys between a shoulder belt and a head upon receiving supply of gas from an inflator in an event of a side impact. The folding method includes folding the head chamber from a front end portion in a seat front-rear direction by outer roll folding, and then folding the head chamber from an intermediate portion by inner roll folding.

According to such a configuration, it is possible to improve the deployment performance of the head chamber constituting the side airbag, as well as to improve the head protection performance of the head chamber.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, with reference to FIGS. 1 to 7, a description will be given of a seat 14 for a vehicle equipped with a side airbag device 10 according to the present embodiment. Incidentally, the arrows FR in each figure, arrows UP, arrows LH and arrows RH, respectively, the seat front side of the seat 14 for the vehicle on which a side airbag device 10 is mounted, the seat upper side, the seat left side, shows the seat right side. When description is made using directions of front and rear, right and left, and up and down, unless otherwise specified, the term front and rear indicates front and rear in a seat front-rear direction, the term right and left indicates right and left in a seat width direction, and the term up and down indicates up and down in a seat up-down direction.

Further, the seat 14 for the vehicle shown in FIGS. 1, 7A, 7B and 7C, the dummy P for collision test instead of the actual occupant is seated. Dummy P is illustratively an internationally uniform side impact dummy (World Side Impact Dummy; World SID) AM 50 (50th percentile of American adult males). In the following description, the dummy is referred to as "occupant P".

Seat for Vehicle

Figure 1:
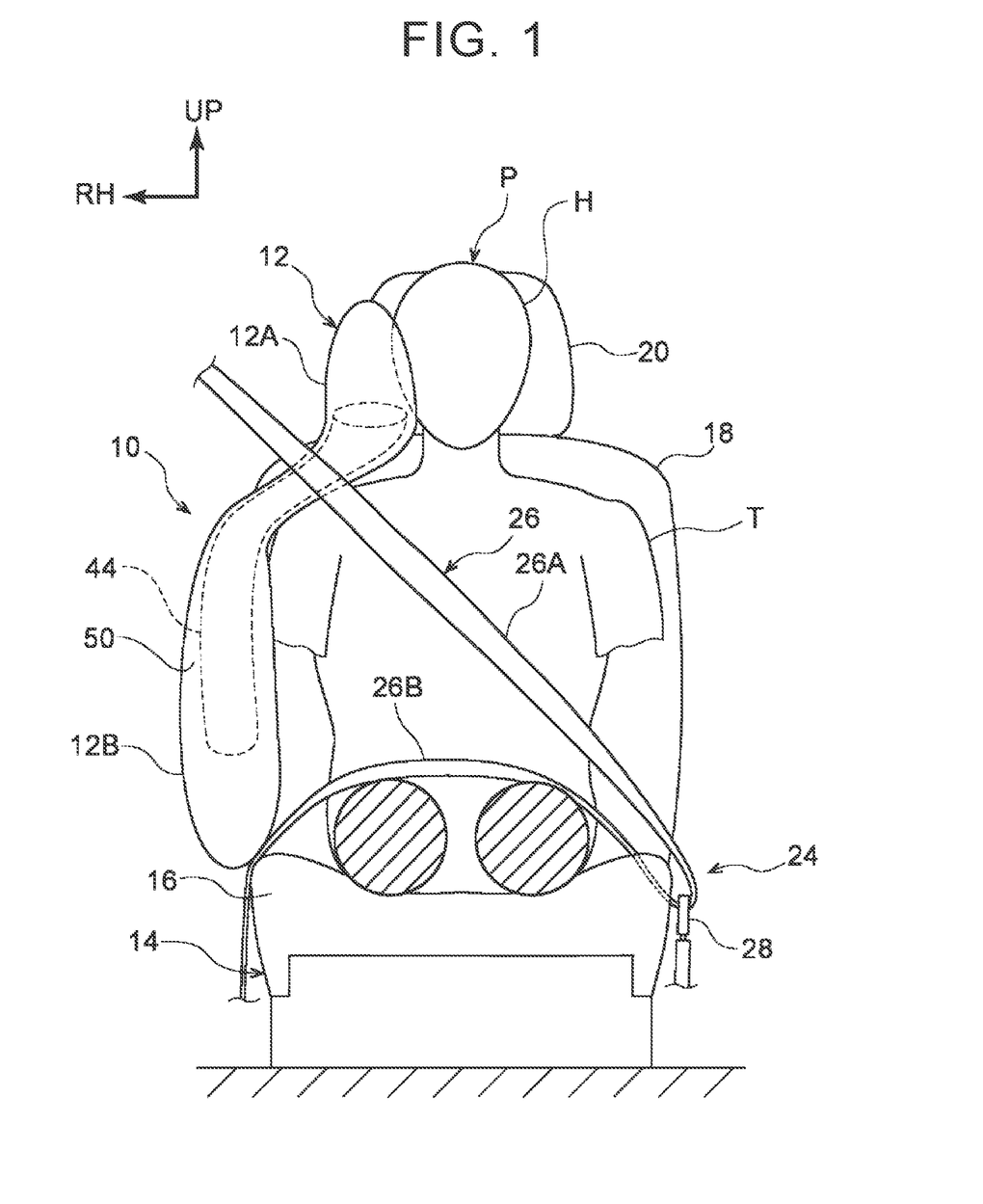
FIG. 1 is a front view showing a seat for a vehicle according to the present embodiment, showing a state in which the side airbag is inflated and deployed.
Figure 2:
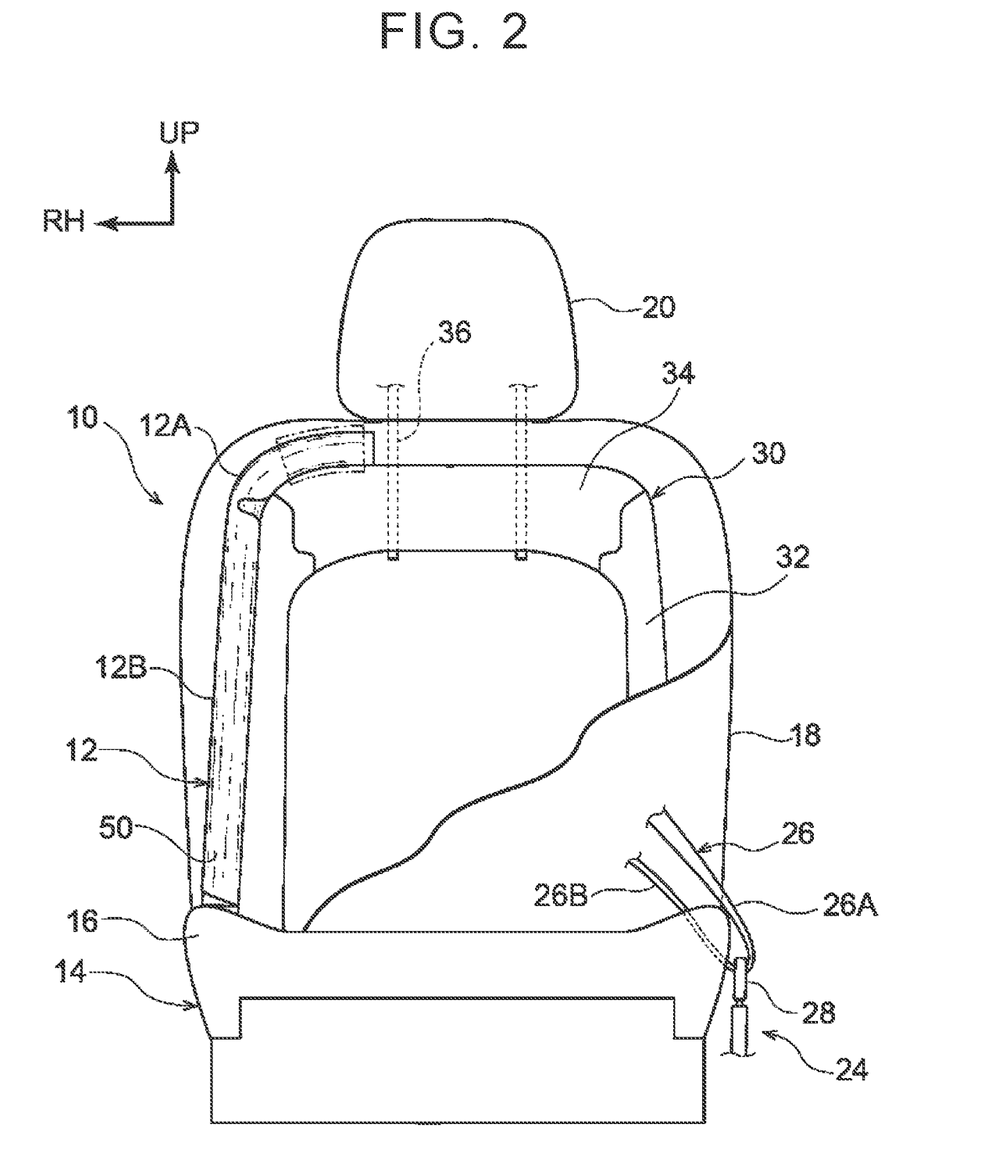
FIG. 2 is a front view showing a partially cut out seat for a vehicle according to the present embodiment, showing a state in which the side airbag is housed.

As shown in FIGS. 1 and 2, the seat 14 for the vehicle on which the side airbag device 10 is mounted is configured to include a seat cushion 16, a seat back 18 and the head rest 20. As an example, the seat 14 for the vehicle is disposed in the driver seat on the right side of the vehicle, and the front of the seat and the front of the vehicle coincide with each other. Further, right and left in the seat width direction and right and left in the vehicle width direction coincide with each other.

The seat cushion 16 extends in the seat front-rear direction and the seat width direction, and is configured such that the seat cushion 16 can support buttocks and thighs of the occupant P. The seat back 18 is rotatably connected to the rear end portion of the seat cushion 16 and extends in the seat up-down direction, and is configured such that the seat back 18 can support the back of the occupant P. The head rest 20 is provided in the upper end portion of the seat back 18 and is configured such that the head rest 20 can support a head H of the occupant P.

Seat Belt Device

The occupant P is restrained by a seat belt device 24 to the seat 14 for the vehicle. The seat belt device 24 is configured to include a webbing 26 that restrains the upper body and waist of the occupant.

The webbing 26 is formed in a long belt shape. Webbing 26 includes a shoulder belt 26A for restraining the upper body of the occupant P to the seat back 18 while being mounted, and a lap belt 26B for restraining the waist of the occupant. The shoulder belt 26A extends diagonally from a shoulder on the right side of the occupant P to the lumbar on the left side. The lower end portion of the shoulder belt 26A is inserted through the tongue plate 28.

The tongue plate 28 is removably configured to the buckle provided on the left side of the sheet (reference numeral omitted). The occupant P is restrained by the webbing 26 by attaching the tongue plate 28 to the buckle.

The webbing 26 extends to the right side of the sheet at one end which is passed through the tongue plate 28 and folded back. Wherein the portion extending in the sheet-width direction, the lap belt 26B is constituted. Therefore, the left end portion of the lap belt 26B is connected to the lower end portion of the shoulder belt 26A. Further, the right end portion of the lap belt 26B is fixed to the belt anchor (not shown) provided on the floor panel.

The upper end portion of the shoulder belt 26A is wound around a shoulder anchor (not shown) provided on the vehicle body. Further, the end portion of the webbing 26 is wound around a retractor (not shown).

Side Airbag Device

Figure 3:
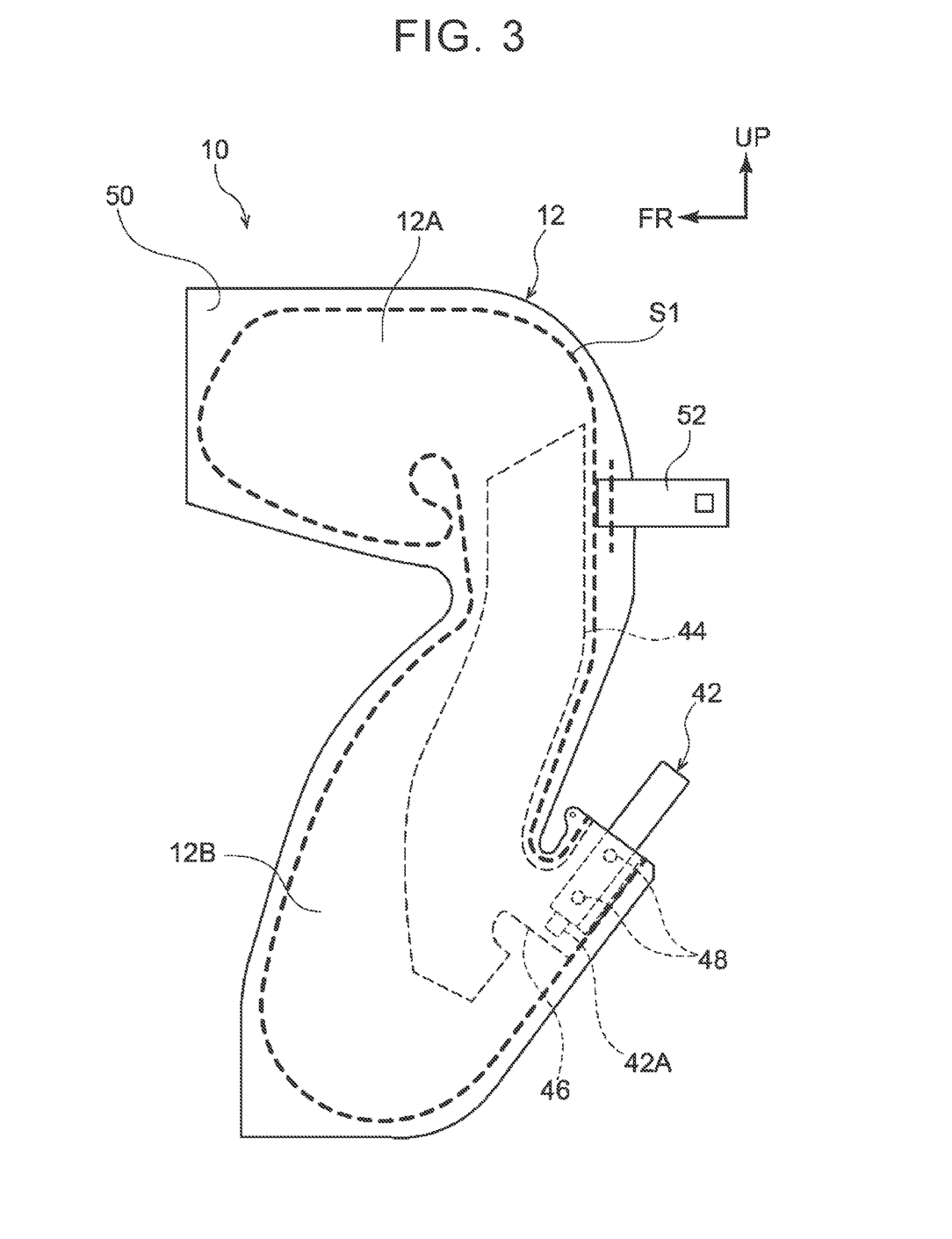
FIG. 3 Side airbag according to the present embodiment is a side view showing an enlarged state of being inflated and deployed.

As shown in FIGS. 2 and 3, the side airbag device 10 is configured to include a side airbag 12, an inflator 42, and a sock 44.

Side airbag 12 is housed inside the seat back 18. Side airbag 12 is fixed to the seat back frame 30 constituting the skeleton of the seat back 18. As its part is shown in FIG. 2, the seat back frame 30 is formed in a rectangular frame shape when viewed from the sheet longitudinal direction. Further, the left and right side portions of the seat back frame 30 is constituted by a side frame 32 extending in the sheet vertical direction. Further, the upper end portion of the seat back frame 30 is constituted by an upper frame 34. Upper frame 34 so as to be passed over the shoulder opening of the left and right side frames 32 (upper end), extending in the sheet width direction. Side airbag 12, via the shoulder mouth from the side of the side frame 32 disposed on the right side of the seat, is housed along the upper frame 34. The side airbag 12 is stored in a state of being folded into an elongated rod shape.

The side airbag 12 is inflated by the supply of the gas generated by the inflator 42. Further, the side airbag 12, by breaking the skin of the seat width direction outer of the seat back 18 by the expansion pressure, is inflated and deployed between the side surface of the body and the vehicle cabin of the occupant P.

The side airbag 12 is composed of a single bag forming a bag body. Side airbag 12 includes a head chamber 12A constituting the upper portion of the seat upper side, and a body chamber 12B constituting the lower portion of the seat lower side.

The head chamber 12A is supplied with gases from the inflator 42 and expands and deploys between the shoulder belt 26A and the head H of the occupant P. The head chamber 12A is configured to cover the side of the head H (see FIG. 1). The body chamber 12B is supplied with gases from the inflator 42 and inflates and deploys on the side of the body portion T of the occupant P, which extends from the shoulder through the chest to the hip. The body chamber 12B is configured to cover the side of the body portion T. A detailed configuration of the side airbag 12 will be described later.

Inflator 42 is a cylinder type gas generator formed in a substantially cylindrical shape, the axial direction of the inflator 42 is a direction along the side frame 32 of the seat back 18. A gas-ejecting portion 42A is provided at a lower end portion of the inflator 42. Gas ejection portion 42A supplies the gas to the side airbag 12 by generating gas when the side impingement of the vehicle is detected or predicted.

As shown in FIG. 3, a part of the inflator 42 is disposed inside the side airbag 12. Inflator 42 has a stud bolt 48 extending from the outer surface disposed inside the side airbag 12 in the sheet width direction inward. By inserting the stud bolt 48 into the mounting hole of the side frame 32 and tightening the stud bolt 48 with a nut, the inflator 42 is secured to the side frame 32 together with the base fabric 50 of the side airbag 12.

A sock 44 made of a cloth material is further provided inside the side airbag 12. Incidentally, the sock 44, a duct, an inner tube, a rectifying cloth, also referred to as a diffuser.

The upper and lower ends of the sock 44 are formed in an open substantially cylindrical shape, and the sock 44 extends in the sheet vertical direction from the head chamber 12A to the body chamber 12B. A bag-shaped inflator insertion portion 46 is integrally provided at the rear end portion of the sock 44. The gas-ejecting portion 42A of the inflator 42 and the inside of the sock 44 communicate with each other via the inflator inserting portion 46. For this purpose, the gases supplied from the inflator 42 are configured to flow through the sock 44 to the head chamber 12A and the body chamber 12B.

Side Airbag

The following describes the detailed configuration of the side airbag 12. The side airbag 12 is formed into a bag shape by arranging two base fabrics 50 made of, for example, a nylon-based or polyester-based fabric material in a sheet width direction and sewing an outer peripheral portion. In FIG. 3, a sewing portion for sewing the outer peripheral portion of the base fabric 50 is indicated by the symbol "S1".

The upper portion of the side airbag 12 is a head chamber 12A that covers the side of the head H of the occupant P during inflation deployment. The head chamber 12A, when viewed from the sheet width direction, is formed in a substantially C-shape in which the cut portion is disposed toward the sheet lower side. A belt-shaped support belt 52 is sewn to the rear end portion of the head chamber 12A. One end of the support belt 52 is attached to a stay 36 (see FIG. 2) constituting the skeleton of the head rest 20, thereby stabilizing the behavior of the head chamber 12A during inflation and deployment.

The lower portion of the side airbag 12 has a body chamber 12B covering the side of the body portion T of the occupant at the time of inflation deployment. The body chamber 12B, when viewed from the sheet width direction, is formed in a drop shape which is bulged downward, and extends vertically along the seat back 18.

(How to Fold the Side Airbag)

As described above, the side airbag 12 having the above-described configuration is accommodated along the skeleton of the seat back 18 in a state of being folded into an elongated rod shape. Hereinafter, a method of folding the side airbag 12 will be described with reference to FIGS. 4A to 5D. Incidentally, in FIGS. 4A to 5D are illustrated omitting the sewing portion S1 of the side airbag 12.

The method of folding the side airbag 12 according to the present embodiment roughly includes a first step and a second step. In the first step, the head chamber 12A is folded back up and down. In the second step, after completion of the first step, the side airbag 12 is rolled folded from the front end portion in the sheet longitudinal direction of the side airbag 12.

Figure 4A:
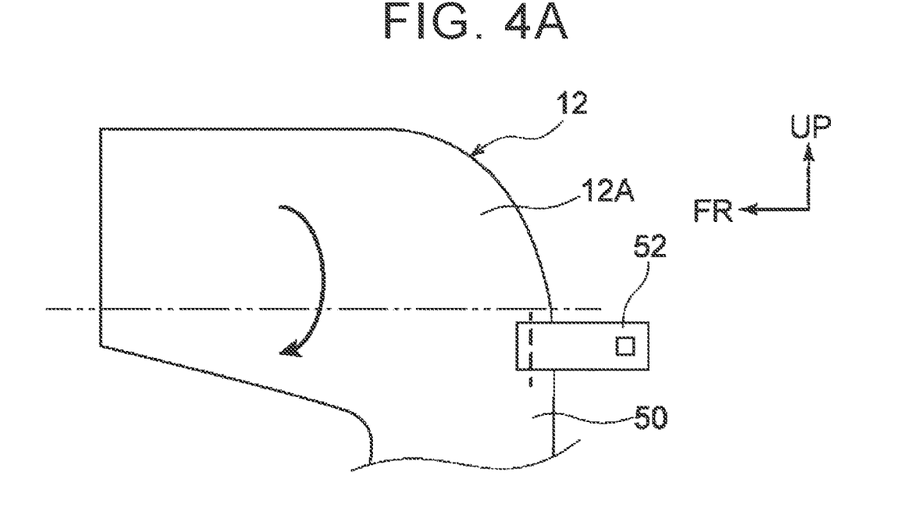
FIG. 4A is an enlarged side view of the head chamber for explaining the folding method of the side airbag according to the present embodiment, is a diagram showing a step of folding the upper end portion in the sheet vertical direction of the head chamber downward toward the occupant side.
Figure 4B:
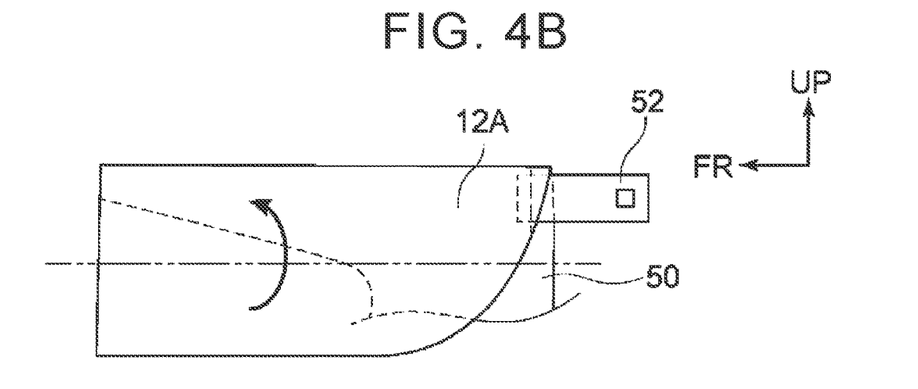
FIG. 4B is an enlarged side view of a head chamber for explaining a folding method of a side airbag according to the present embodiment, is a diagram showing a step of folding the folded lower end portion of the head chamber upward toward the occupant side.
Figure 4C:
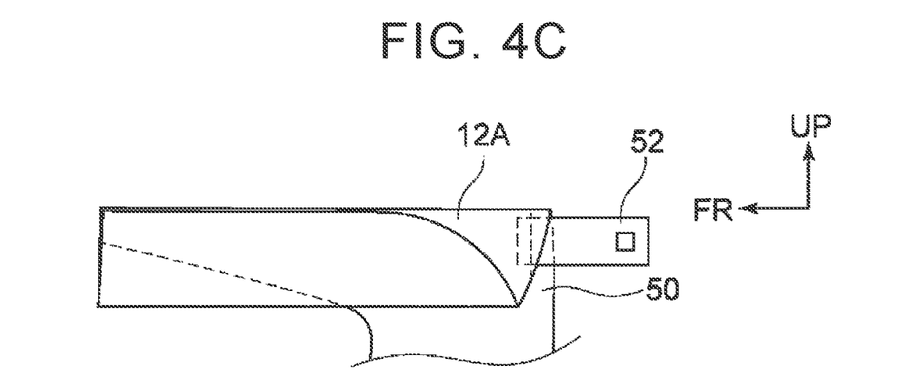
FIG. 4C is an enlarged side view of the head chamber for explaining the folding method of the side airbag according to the present embodiment, and is a view showing the head chamber with the process of FIGS. 4A and 4B completed.

Referring to FIGS. 4A to 4C, the first step will be described. In FIGS. 4A and 4B, the folding line of the head chamber 12A in the respective steps is indicated by a two-dot chain line.

As shown in FIG. 4A, in the first step, first, the upper end portion of the head chamber 12A in the seat vertical direction is folded back downward toward the occupant P side (inside the seat). By this process, the portion which was the upper end portion of the head chamber 12A prior to turning back is turned back to be the lower end portion.

Next, as shown in FIG. 4B, the folded lower end portion is folded upward toward the occupant P.

Through the above process, the head chamber 12A is folded a plurality of times (twice in the present embodiment) in the vertical direction of the seat to be folded in a bellows-folded state, and the vertical width of the folded state is reduced as shown in FIG. 4C. This completes the first process.

Referring to FIGS. 5A to 5D, the second step will be described. In this second step, the side airbag 12 is rolled and folded by winding the base fabric 50 around the elongated rod-shaped winding shaft rod 40.

Figure 5A:
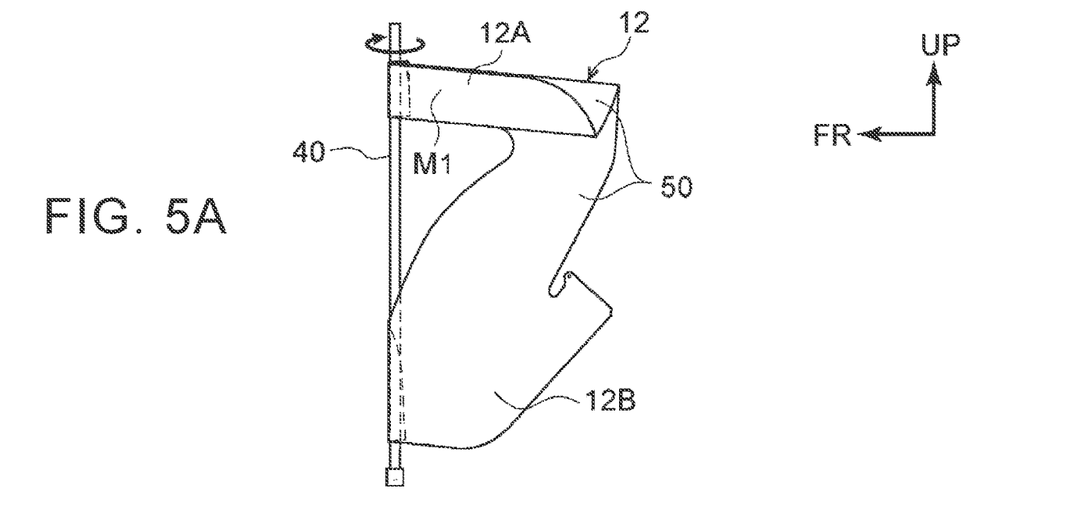
FIG. 5A is a diagram for explaining a folding method of the side airbag according to the present embodiment, the head chamber and the body chamber is a side view showing a winding start of the step of being outer roll folded from the front end portion in the sheet longitudinal direction.

As shown in FIG. 5A, in the second step, first, set the winding shaft rod 40 of the posture of substantially the sheet vertical direction and the axial direction, the base fabric 50 of the side airbag 12 toward the rear end portion from the front end portion in the sheet longitudinal direction of the side airbag 12 outer roll folding.

Incidentally, the outer roll folding is a folding method for winding the tip of the roll folding in a roll shape so as to be wound around the sheet outside (opposite to the sheet inside facing the occupant P).

Figure 5B:
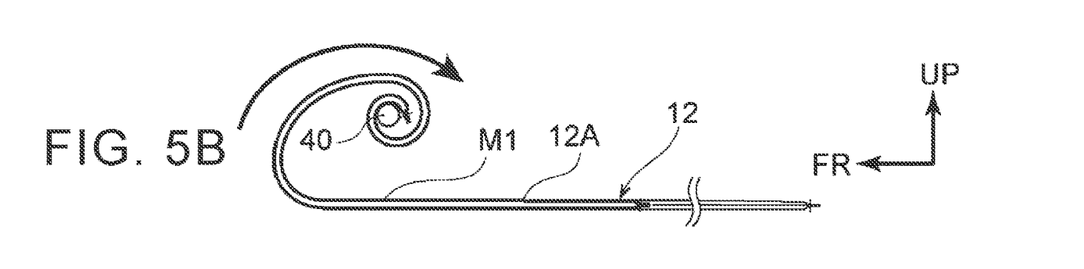
FIG. 5B is a diagram for explaining a folding method of the side airbag according to the present embodiment, the head chamber is an enlarged sectional view showing a step of being folded outer roll from the front end portion in the sheet longitudinal direction.

In FIG. 5B, an enlarged plan view shows how the head chamber 12A is folded by the outer roll from the front end in the longitudinal direction of the seat. In this process, the entire side airbag 12, including the head chamber 12A and the body chamber 12B, is folded over the outer rolls.

Figures 5C, 5D:
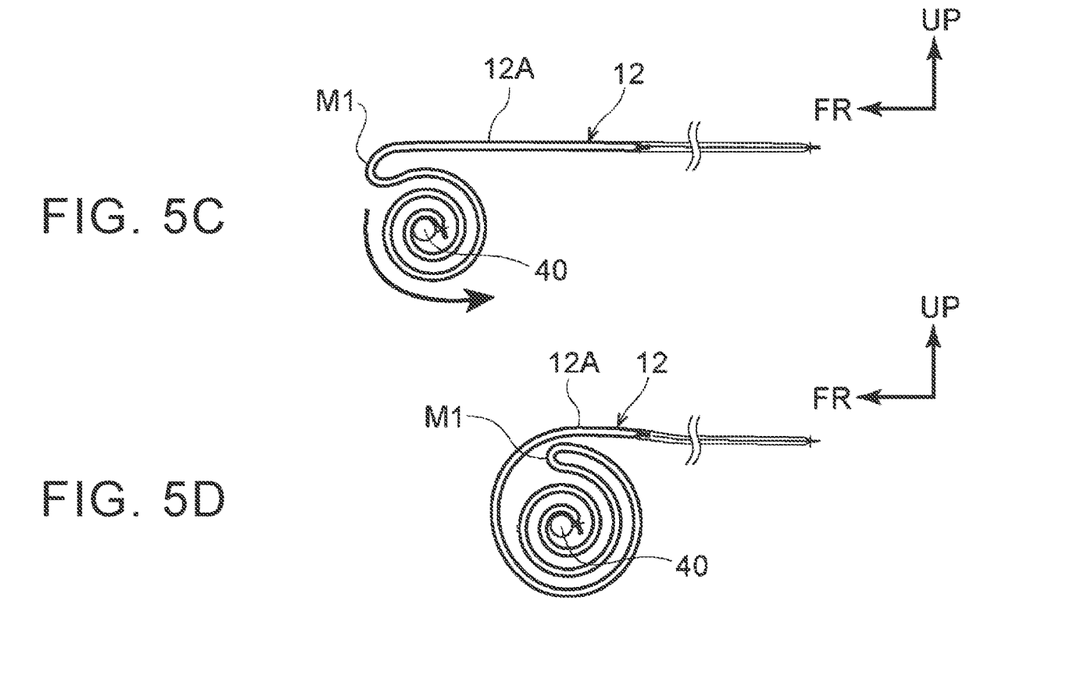
FIG. 5C is a diagram for explaining a folding method of the side airbag according to the present embodiment, the head chamber is an enlarged sectional view showing a step of being inner roll folded from the intermediate portion in the sheet longitudinal direction.
FIG. 5D is a diagram for explaining a folding method of the side airbag according to the present embodiment, is an enlarged sectional view showing a head chamber in a state in which the process of FIG. 5A to FIG. 5C are completed.

Then, when the outer roll folding of the head chamber 12A is completed to the intermediate portion M1 in the sheet front-rear direction, only the head chamber 12A is folded by the inner roll from the intermediate portion M1 toward the rear end as shown in FIG. 5C. Therefore, the body chamber 12B is outer roll-folded from the front end portion to the rear end portion in the longitudinal direction of the seat. The intermediate portion M1, as an example, upon expansion deployment, is in the vicinity of a position where the head chamber 12A intersects the shoulder belt 26A.

Incidentally, the inner roll folding is a folding method in which the leading end of the roll folding is wound into a roll shape (roll folding) so as to be wound inside the sheet. Also, "near a position where the head chamber 12A intersects the shoulder belt 26A" includes a position where the head chamber 12A intersects the shoulder belt 26A, as well as a position where the head chamber 12A is located at a position where it intersects the shoulder belt 26A.

Through the above process, as shown in FIG. 5D, the rear end portion of the head chamber 12A in the front and rear directions of the sheet, which is the end of winding, is folded by the inner rolls. This completes the second process.

The side airbag 12 folded through the first step and the second step has an elongated rod-like shape. Then, as shown in FIG. 2, in a state of being accommodated in the seat back 18, the head chamber 12A is accommodated along the upper frame 34 of the seat back frame 30, the body chamber 12B is accommodated along the shoulder mouth from the side of the side frame 32.

Since the upper and lower widths of the head chamber 12A are set small by the first process described above, the top end of the head chamber 12A is disposed outside the stay 36 of the head rest 20. That is, the head chamber 12A is housed in a position which does not overlap with the skeleton of the head rest 20.

(Deployment Behavior of Head Chamber)

The behavior of the head chamber 12A during expansion and deployment will be described in detail below. First, referring to the plan view of FIGS. 6A to 6C, the behavior of the head chamber 12A will be described.

When the gas from the inflator 42 is supplied to the side airbag 12, the skin of the upper end portion of the seat back 18 is cleaved, and the head chamber 12A is inflated and deployed toward the front side of the seat. At this time, since the head chamber 12A is disposed at a position not overlapping with the skeleton of the head rest 20 along the upper frame 34, the head chamber 12A can be expanded to the seat front side by suppressing the interference with the skeleton of the head rest 20.

Figure 6A:
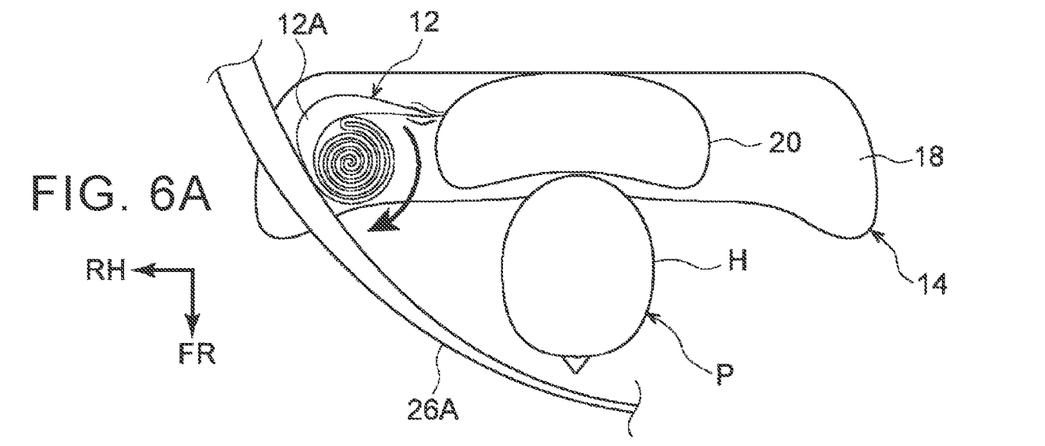
FIG. 6A is a plan view of a seat for a vehicle for explaining the behavior at the time of expansion deployment of the side airbag according to the present embodiment, is a diagram showing the behavior of the initial expansion deployment of the side airbag.

As shown in FIG. 6A, at the beginning of the inflation and deployment of the head chamber 12A, the inner roll fold applied to the rear end of the head chamber 12A is released. At this time, the inner roll folding of the head chamber 12A is released toward the inside of the seat between the shoulder belt 26A and the head rest 20. Therefore, the head chamber 12A can be deployed to the front side of the seat to suppress interference with the shoulder belt 26A.

Figure 6B:
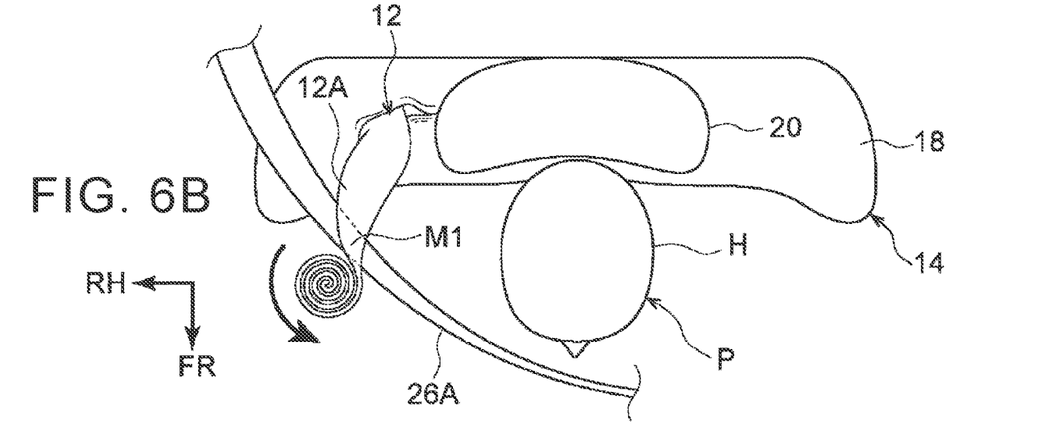
FIG. 6B is a plan view of a seat for a vehicle for explaining the behavior at the time of expansion and deployment of the side airbag according to the present embodiment is a diagram showing the behavior of the expansion and deployment mid phase of the side airbag.
Figure 6C:
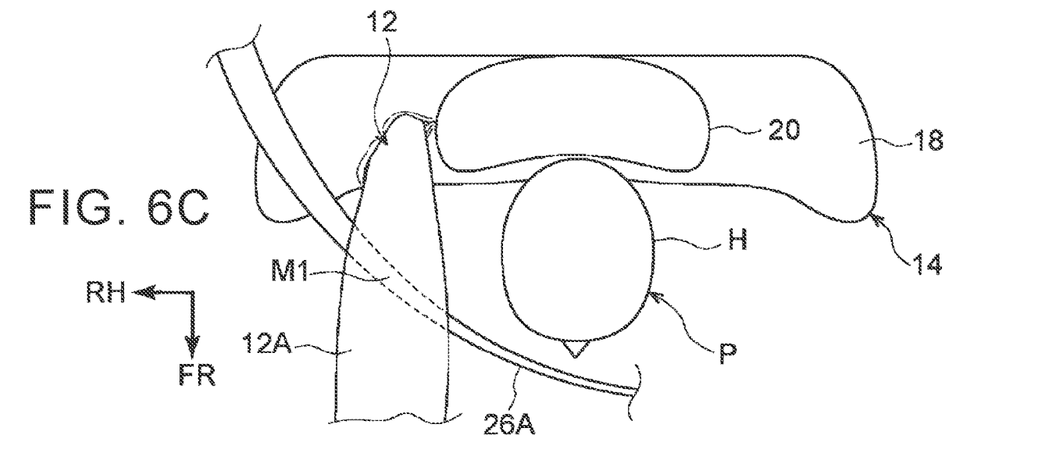
FIG. 6C is a plan view of a seat for a vehicle for explaining the behavior at the time of expansion and deployment of the side airbag according to the present embodiment, is a diagram showing the behavior of the expansion and deployment late of the side airbag.

As shown in FIG. 6B, during the middle of expansion deployment of the head chamber 12A, the head chamber 12A rides over the shoulder belt 26A and the outer roll fold applied to the front end from the intermediate portion M1 of the head chamber 12A is released (FIG. 6C). At this time, the head chamber 12A expands and develops on the side of the head H of the occupant P, but the outer roll folding is released toward the outside of the seat. Therefore, it is possible to avoid causing abrasion on the side surface of the head H due to friction with the head chamber 12A.

Figure 7A:
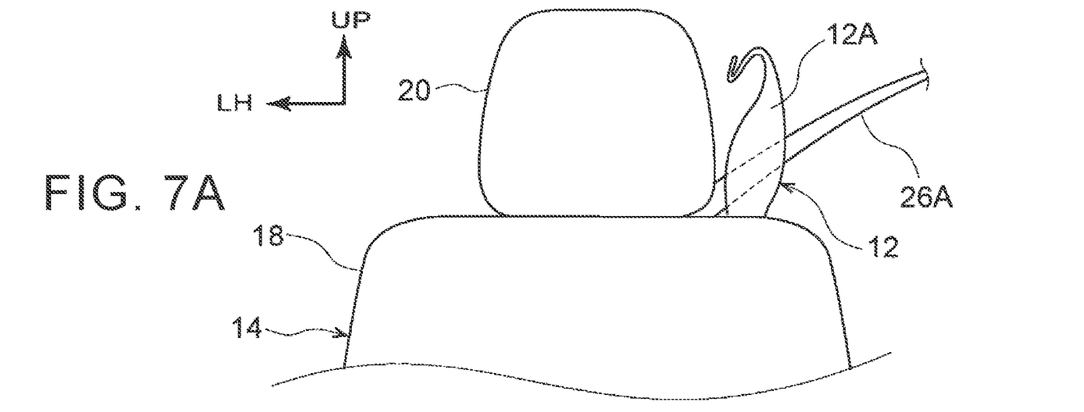
FIG. 7A is a partial rear view of the seat for the vehicle for explaining the behavior at the time of expansion and deployment of the side airbag according to the present embodiment, is a diagram showing the behavior of the initial expansion and deployment of the side airbag.
Figure 7B:
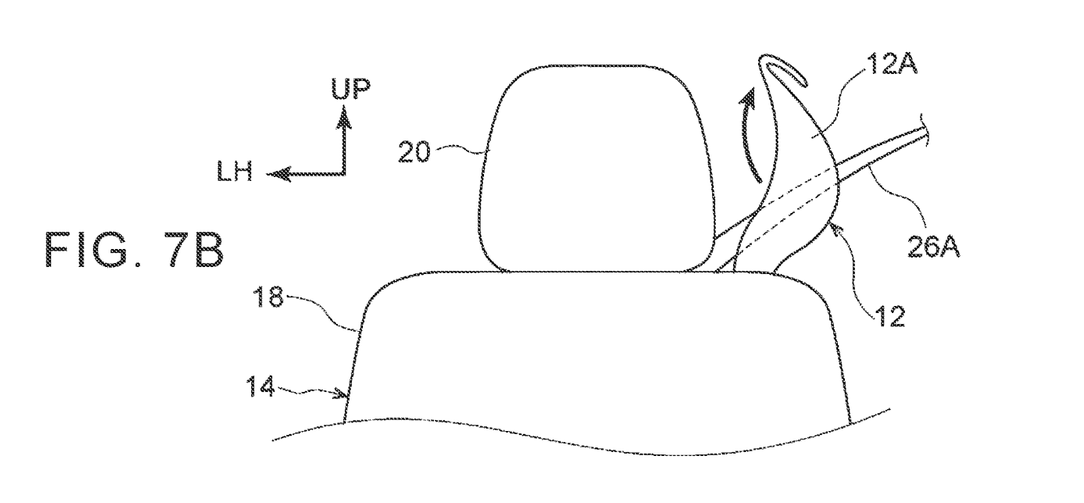
FIG. 7B is a partial rear view of the seat for the vehicle for explaining the behavior at the time of inflation and deployment of the side airbag according to the present embodiment, is a diagram showing the behavior of the inflation and deployment mid phase of the side airbag.
Figure 7C:
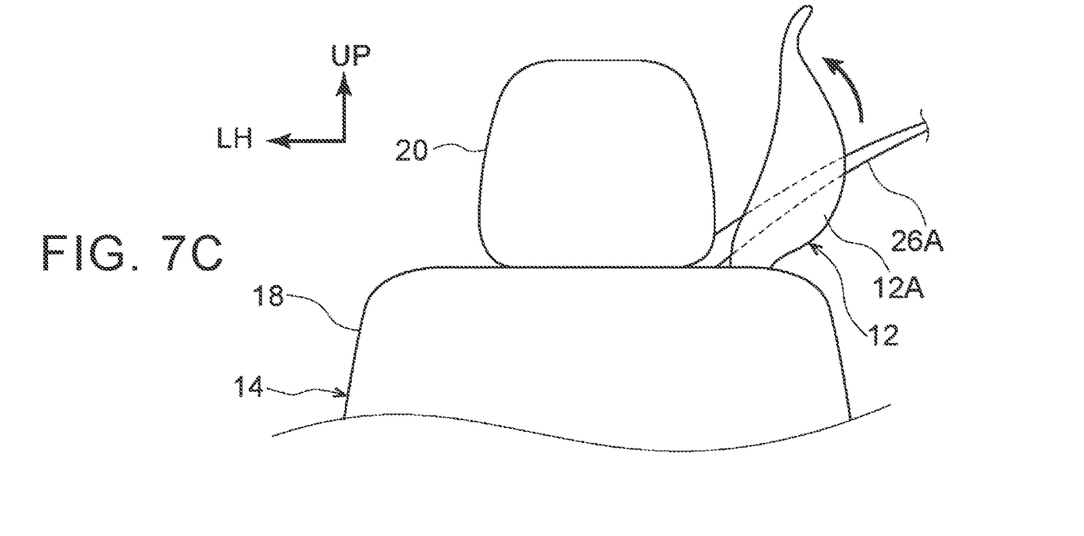
FIG. 7C is a partial rear view of the seat for the vehicle for explaining the behavior at the time of expansion and deployment of the side airbag according to the present embodiment is a diagram showing the behavior of the expansion and deployment later stage of the side airbag.

Referring now to the partial back view of FIGS. 7A to 7C, the behavior of the head chamber 12A will be described. As shown in FIGS. 7A to 7C, at the time of expansion and expansion of the head chamber 12A, the roll folding is released, and at the same time, the bellows folding formed by folding the head chamber 12A vertically is released. When this bellows folding is released, the upper end of the head chamber 12A is deployed to the seat upper side, allowing the shoulder belt 26A to easily ride over.

Furthermore, in the present embodiment, since the head chamber 12A is folded up and down the seat toward the occupant P side, the bellows folding is released toward the seat upper side and the seat inner side. Therefore, it is possible to satisfactorily secure a space for deploying the head chamber 12A between the shoulder belt 26A and the head rest 20.

Incidentally, even when the upper end portion of the head chamber 12A is housed by folding back one time below the sheet, it is possible to obtain a certain effect of rapidly deploying the head chamber 12A to the upper side of the sheet. However, by folding the head chamber 12A twice as in the present embodiment, it is possible to reduce the swing of the head chamber 12A in the seat width direction at the time of deployment, thereby enhancing the expandability toward the upper side of the seat.

Operations and Effects

As described above, in the seat 14 for the vehicle of the present embodiment, at the time of side collision, the side airbag 12 is inflated and deployed by receiving a supply of gas from the inflator 42. The side airbag 12 has a head chamber 12A housed along the upper frame 34 of the seat back 18. The head chamber 12A expands and deploys between the shoulder belt 26A and the head H to prematurely constrain the head H of the occupant P.

Here, in the present embodiment, the head chamber 12A is stored in a state in which it is folded by an outer roll from the front end portion in the front-rear direction of the sheet and is folded by an inner roll from the intermediate portion M1 in the front-rear direction of the sheet. Therefore, during the early stage of expansion and deployment of the head chamber 12A, the inner roll folding is released toward the inside of the seat between the shoulder belt 26A and the head rest 20. Consequently, the expansion and deployment of the head chamber 12A to the forward side of the seat is not impaired by the shoulder belt 26A, and the deployment performance of the head chamber 12A can be improved. Thereafter, in the middle of the deployment of the head chamber 12A, the outer rolls are unfolded toward the outside of the seat on the side of the head H. As a result, the side surface of the head H can be prevented from being damaged by the head chamber 12A, and the head protecting performance can be improved.

Further, the intermediate portion M1 of the head chamber 12A is positioned in the vicinity of a position intersecting the shoulder belt 26A upon expansion and deployment. Therefore, in the head chamber 12A, when the expansion and deployment to the front side of the seat, the inner roll folding is released to a position where the shoulder belt 26A is overcome, and the release of the outer roll folding is started after the shoulder belt is overcome. Consequently, in areas where it may interfere with the shoulder belt 26A, the head chamber 12A can be expanded and deployed toward the inside of the seat to ensure deployment spacing, thereby making it more reliable to ride over the shoulder belt 26A.

Furthermore, the head chamber 12A is housed in a state of being rolled from the front end portion in the sheet longitudinal direction after being folded back in the sheet vertical direction to reduce the vertical width. Therefore, when the head chamber 12A is accommodated along the upper frame 34, it can be accommodated at a position where it does not overlap with the skeleton of the head rest 20. Consequently, the expansion and deployment of the head chamber 12A to the forward side of the seat is not impaired by the head rest 20, and the deployment performance of the head chamber 12A is improved.

Further, the head chamber 12A folds the upper end portion in the sheet vertical direction downward toward the occupant P side, and the folded lower end portion is folded upward toward the occupant P side, so that the folding in the sheet vertical direction is a bellows folding. Therefore, since the bellows folding is released toward the upper side of the seat and toward the inner side of the seat at the early stage of the expansion and expansion of the head chamber 12A, the head chamber 12A can be expanded toward the upper side of the seat to ride over the shoulder belt 26A. Further, deployment toward the inside of the seat allows for deployment clearance between the shoulder belt 26A and the head rest 20. In this way, the expansion and deployment of the head chamber 12A to the forward side of the seat is not impaired by the shoulder belt 26A and the deployment performance of the head chamber 12A is improved.

Further, in the present embodiment, the side airbag 12, at the time of side impact of the vehicle has a body chamber 12B which expands and deploys to the side of the body portion T of the occupant P. The body chamber 12B is housed along the shoulder mouth from the side of the side frame 32 of the seat back 18 by being composed of a single bag together with the head chamber 12A. Thus, the side airbag 12, by configuring the head chamber 12A and the body chamber 12B in a single bag, can be accommodated along the upper frame 34 through the shoulder mouth from the side of the side frame 32, it is easy to mount. Further, since the entire side airbag 12 including the head chamber 12A and the body chamber 12B is folded by rolling from the front end portion in the longitudinal direction of the seat, it is possible to reduce the steps required when folding into the form at the time of storage, it can be easily manufactured.

Supplementary Description

While the side airbag device 10 according to the embodiment has been described above, it is to be understood that this disclosure can be embodied in various forms, without departing from the principle of the disclosure.

Further, in the above embodiment, the side airbag 12 has a configuration that expands and deploys from the side of the vehicle width direction outside of the body of the occupant P, not limited thereto. Side airbag 12 may be configured to inflate and deploy from the side of the vehicle width direction inner (vehicle center side) of the body of the occupant P.

Further, in the above embodiment, the side airbag device 10 was mounted on the front seat of the vehicle, the present disclosure is not limited thereto, it may be mounted side airbag device 10 in the rear seat of the vehicle.

What is claimed is:

1. A seat for a vehicle, comprising a side airbag stored along an upper frame of a seat back and including a head chamber configured to expand and deploy between a shoulder belt and a head by receiving supply of gas from an inflator in an event of a side impact, wherein the head chamber is configured to be stored in an outer roll folded state in which a tip of a roll folding is wound in a roll shape so as to be wound toward an outside of the seat from a front end portion in a seat front-rear direction, and to be stored in an inner roll folded state in which the tip of the roll folding is wound in a roll shape so as to be wound toward an inside of the seat from an intermediate portion.

2. The seat according to claim 1, wherein the head chamber is configured such that the intermediate portion of the head chamber is in a vicinity of a position intersecting the shoulder belt upon expansion and deployment of the head chamber.

3. The seat according to claim 1, wherein the head chamber is configured to be stored in a state in which an upper end portion in a seat up-down direction is folded downward toward an occupant side, and a folded lower end portion is folded upward toward the occupant side, and then the head chamber is rolled and folded from the front end portion in the seat front-rear direction.

4. The seat according to claim 1, wherein:
the side airbag is configured to be stored along a shoulder from a side of a side frame of the seat back, and to further include a body chamber that expands and deploys toward a side of a body portion in the event of the side impact; and
the head chamber and the body chamber are composed of a single bag and are configured to be stored in a state of being rolled and folded from the front end portion in the seat front-rear direction.

5. A folding method of a side airbag including a head chamber configured to expand and deploy between a shoulder belt and a head upon receiving supply of gas from an inflator in an event of a side impact, the folding method comprising folding the head chamber from a front end portion in a seat front-rear direction by outer roll folding, and then folding the head chamber from an intermediate portion by inner roll folding.

6. The folding method according to claim 5, wherein the head chamber is configured to be stored in a state in which an upper end portion in a seat up-down direction is folded downward toward an occupant side, and a folded lower end portion is folded upward toward the occupant side, and then the head chamber is rolled and folded from the front end portion in the seat front-rear direction.

* * * * *